(12) United States Patent
Park et al.

(10) Patent No.: US 12,127,083 B2
(45) Date of Patent: Oct. 22, 2024

(54) V2X MESH NETWORK SYSTEM AND OPERATING METHOD THEREOF

(71) Applicants: HYUNDAI MOTOR COMPANY, Seoul (KR); Kia Corporation, Seoul (KR)

(72) Inventors: Jun Yeon Park, Gunpo-si (KR); David Oh, Yongin-si (KR); Jihoon Park, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 400 days.

(21) Appl. No.: 17/406,467

(22) Filed: Aug. 19, 2021

(65) Prior Publication Data

US 2022/0078589 A1  Mar. 10, 2022

(30) Foreign Application Priority Data

Sep. 4, 2020  (KR) .................. 10-2020-0113346

(51) Int. Cl.
*H04W 4/00* (2018.01)
*H04W 4/40* (2018.01)
*H04W 84/18* (2009.01)

(52) U.S. Cl.
CPC .............. *H04W 4/40* (2018.02); *H04W 84/18* (2013.01)

(58) Field of Classification Search
CPC ... H04W 36/362; H04W 80/04; H04W 88/06; H04W 88/08; H04W 84/18; H04W 4/40; H04W 92/18; H04W 4/44; H04W 12/06; H04W 16/26; H04W 16/28; H04W 40/24; H04W 84/047; H04L 29/06; G01S 19/07; G01S 19/235

See application file for complete search history.

(56) References Cited

U.S. PATENT DOCUMENTS

| | | | |
|---|---|---|---|
| 2012/0142352 A1* | 6/2012 | Zhang ............... | H04W 36/0072 455/436 |
| 2013/0301584 A1* | 11/2013 | Addepalli ............. | H04W 72/53 370/329 |
| 2016/0150451 A1* | 5/2016 | Barreto De Miranda Sargento .... | H04W 36/30 370/332 |
| 2018/0049274 A1* | 2/2018 | Kim ...................... | H04W 84/18 |
| 2020/0107168 A1* | 4/2020 | Thubert .............. | H04W 40/026 |

(Continued)

FOREIGN PATENT DOCUMENTS

| | | |
|---|---|---|
| KR | 10-1601774 B1 | 3/2016 |
| KR | 10-2018-0018454 A | 2/2018 |

(Continued)

*Primary Examiner* — Phuongchau Ba Nguyen
(74) *Attorney, Agent, or Firm* — MORGAN, LEWIS & BOCKIUS LLP (57) ABSTRACT

A vehicle to everything (V2X) mesh network system supporting a mobility operation of a production factory includes a road side unit (RSU) which is disposed in plural in the production factory, and connects infra-to-infra (I2I) wireless communication with an infrastructure facility, and connects vehicle-to-infra (V2I) wireless communication with an on board unit (OBU) mounted on an autonomous driving vehicle to form a V2X mesh network; and a control server controlling operation states of the RSU and the vehicle through the V2X mesh network.

11 Claims, 7 Drawing Sheets

(56) References Cited

U.S. PATENT DOCUMENTS

| | | | |
|---|---|---|---|
| 2020/0204952 A1* | 6/2020 | Sorrentino | H04L 67/12 |
| 2020/0288466 A1* | 9/2020 | Kim | H04W 52/0216 |
| 2022/0014549 A1* | 1/2022 | Yang | H04L 9/3268 |
| 2022/0039082 A1* | 2/2022 | Belleschi | H04W 72/51 |
| 2022/0110042 A1* | 4/2022 | Park | H04W 36/32 |
| 2022/0225406 A1* | 7/2022 | Kim | H04W 74/0866 |

FOREIGN PATENT DOCUMENTS

| | | |
|---|---|---|
| KR | 10-2019-0019469 A | 2/2019 |
| KR | 10-2019-0080798 A | 7/2019 |

\* cited by examiner

I2I antenna

| | θ-Pol(H) | | | H(θ=90) | | | |
|---|---|---|---|---|---|---|---|
| Freq.[MHz] | Eff.[%] | Avg.[dBi] | Peak[dBi] | Avg.[dBi] | Peak[dBi] | Φ[deg] | BW[deg] |
| 5850 | 57.84 | -2.38 | 8.7 | 6.86 | 8.7 | 90 | 140.08 |
| 5875 | 53.51 | -2.72 | 8.01 | 6.44 | 8.01 | 90 | 145.86 |
| 5880 | 55.66 | -2.54 | 8.11 | 6.55 | 8.11 | 295 | 146 |
| 5925 | 50.92 | -2.93 | 7.57 | 5.56 | 7.57 | 295 | 138.66 |

FIG. 5

V2I antenna

| Freq.[MHz] | Θ-Pol(H) | | | H(Θ=90) | | |
|---|---|---|---|---|---|---|
| | Eff.[%] | Avg.[dBi] | Peak[dBi] | Avg.[dBi] | Peak[dBi] | BW[deg] |
| 5850 | 55.71 | -2.54 | 7.89 | 6.76 | 7.89 | 360 |
| 5875 | 54.32 | -2.65 | 7.75 | 6.67 | 7.75 | 360 |
| 5880 | 56.04 | -2.52 | 7.8 | 6.79 | 7.8 | 360 |
| 5925 | 50.49 | -2.97 | 7.34 | 6.27 | 7.34 | 360 |

V2X MESH NETWORK SYSTEM AND OPERATING METHOD THEREOF

CROSS-REFERENCE TO RELATED APPLICATION

The present application claims priority to Korean Patent Application No. 10-2020-0113346 filed on Sep. 4, 2020, the entire contents of which is incorporated herein for all purposes by this reference.

BACKGROUND OF THE INVENTION

Field of the Invention

The present invention relates to a V2X mesh network system and an operating method thereof, and more particularly, to a private V2X mesh network system and an operating method thereof, which support a mobility operation of a production factory.

Description of Related Art

In automotive production factories, data is transmitted and received by utilizing a wireless LAN of (WiFi) of an unlicensed band or paid carrier networks (LTE, 5G, etc.) for a wireless facility operation.

In the case of a conventional wireless LAN (WiFi), communication breaking or an error occurs due to channel interference, and in a carrier network, when a line is used, fixed communication cost occurs and internal/external network cut-off is impossible, and as a result, there is a problem in being vulnerable to a security.

Meanwhile, in recent years, construction of Vehicle to Everything (V2X) private dedicated network with high reliability and without separate communication cost depending on application extension of a mobility operation facility in the production factory has been required.

Figure 7A:
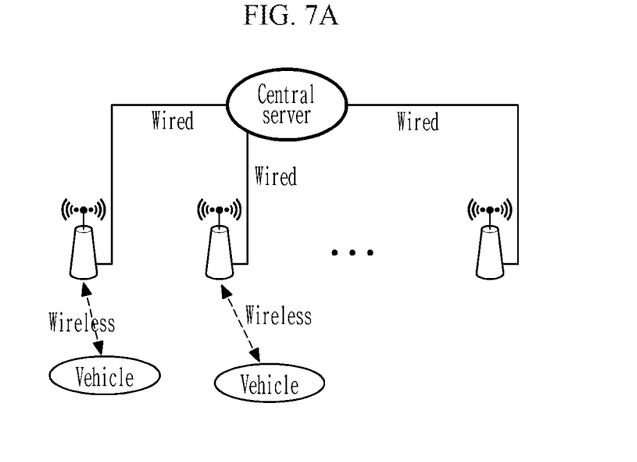
FIG. 7A and FIG. 7B illustrate conventional various V2X network construction schemes.
Figure 7B:
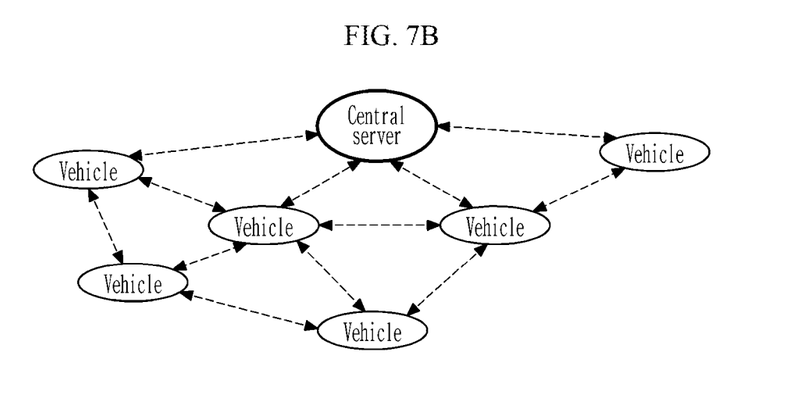

FIG. 7A and FIG. 7B illustrate conventional various V2X network construction schemes.

Referring to FIGS. 7A and 7B, the conventional V2X network may be constructed by a repeater (infrastructure) based single topology scheme in FIG. 7A and an Ad-hoc based star topology mesh scheme in FIG. 7B.

First, in the case of the repeater (infrastructure) based scheme in FIG. 7A, an installation construction and pulling work for connecting a central server and a wired network are required at each repeat installation point, and as a result, there is a problem in that initial construction cost increases. Furthermore, there is a problem in that when cable disconnection or a failure occurs, it is difficult to determine a location of the cable disconnection or the failure, and maintenance time and cost increase due to excavation work piping/manhole pulling.

Furthermore, in the case of the Ad-hoc based scheme in FIG. 7B, there is a problem in that a network configuration varies in real time due to mobility and fluidity of a mobility (vehicle), reliable communication implementation is difficult and there is a limit in transmission of massive data such as a video, etc.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a V2X mesh network system and an operating method thereof, which simultaneously support inter-infrastructure wireless communication (I2I) and vehicle-to-vehicle wireless communication (V2I) by constructing a private mesh network through a road side unit (RSU) with a heterogeneous V2X module.

Various aspects of the present invention are directed to providing a vehicle to everything (V2X) mesh network system supporting a mobility operation of a production factory which includes: a road side unit (RSU) which is disposed in plural in a production factory, and connects infra-to-infra (I2I) wireless communication with an infrastructure facility, and connects vehicle-to-infra (V2I) wireless communication with an on board unit (OBU) mounted on an autonomous driving vehicle to form a V2X mesh network, and a control server controlling operation states of the RSU and the vehicle through the V2X mesh network.

Furthermore, the OBU may transmit and receive V2X communication data through an integrated antenna and measure global navigation satellite system (GNSS) according to vehicular position information of the vehicle.

Furthermore, the RSU may include an I2I antenna which is provided on a top portion of a main body of the RSU in plural, and is connected to a wireless access in vehicular environment (WAVE) based I2I communication module for constructing a private mesh network to transmit and receive data between other RSUs, a V2I antenna which is provided on a bottom portion of the main body in plural, and is connected to the WAVE based V2I communication module to transmit and receive data to and from the OBU, a GNSS antenna which is connected to a GNSS module and receives a satellite signal for measuring vehicle position information, a power supply module which converts an AC power into a DC power required for operating the RSU and supplies the DC power, an external interface module which is connected to an external maintenance equipment, and provides at least one of firmware upgrade, software change, and environment setting, and a control module which is electrically connected to the I2I communication module, the V2I communication module and the GNSS module, relays data transmitted and received between the OBU and the control server connected by V2X wireless communication.

Furthermore, the I2I antenna and the V2I antenna may differently set a radiation pattern for each channel according to I2I and V2I wireless communication schemes.

Furthermore, the I2I antenna may be oriented to another RSU disposed in a horizontal direction at a predetermined height from the ground to form a radiation pattern having a relatively small vertical width in the horizontal direction, and the V2I antenna may be oriented to a lower direction of the ground to form a radiation pattern having a relatively larger vertical width than the I2I antenna.

Furthermore, the GNSS module may receive multi bands (L1/L2) of one or more satellite signals of GPS, GLONASS, and Galileo, and acquire high-precision position information of which an error is corrected by real time Kinematic (RTK) supporting.

Furthermore, the GNSS module may generate high-precision RTK-GNSS based positioning error correction information (Radio Technical Commission Marine (RTCM) based on a fixed absolute coordinate of the RSU and provide the generated RTCM to the OBU.

Furthermore, the GNSS module provided in a designated main RSU may share the positioning error correction information (RTCM) with surrounding sub RSUs and provide the RTCM to OBUs connected thereto, respectively.

Furthermore, the OBU may correct the vehicle position information with the positioning error correction information (RTCM).

Furthermore, the external interface module may connect at least one detection equipment of a monitoring camera, a radar, LiDAR, a temperature sensor, an infrared sensor, and a gyro sensor provided and operated in road infrastructures.

Furthermore, the control module may broadcast unique RSU-ID to a coverage region through the V2I communication module and connect new V2I wireless communication with the OBU which is turned on and enters in a region.

Furthermore, the control module may receive a Media Access Control (MAC) address and update the received MAC address to a routing table when connecting the OBU, and share the updated routing table with other surrounding RSUs through the I2I wireless communication.

Furthermore, the control module may control a handover depending on a request from the OBU which enters or exits to a coverage region from a coverage overlapping region with another neighboring RSU to share a resulting added/deleted routing table with another RSU.

Furthermore, the control module may receive and store validity information and encryption information related to the MAC address assigned to the OBU from the control server, and connect the V2I communication only with respect to the OBU which is normally authorized according to the received and stored validity information and encryption information.

Meanwhile, various aspects of the present invention are directed to providing an operating method of a road side unit (RSU) disposed in a production factory in plural and constituting a vehicle to everything (V2X) mesh network, which includes: a) receiving a MAC address according to a connection request of an on board unit (OBU) in which the RSU exists in a coverage region and connecting vehicle-to-infra (V2I) wireless communication; b) additionally updating the MAC address to a routing table, and sharing the routing table with another RSU connected by infra-to-infra (I2I) wireless communication; c) providing RTK-GNSS based positioning error correction information (Radio Technical Commission Marine (RTCM)) generated based on a fixed absolute coordinate to the OBU; and d) when the OBU is handed over to another neighboring RSU, deleting the MAC address from the routing table and terminating the connection.

Furthermore, the operating method may further include, before step a), broadcasting unique RSU-ID for accessing the OBU to the coverage region.

Furthermore, step a) may include checking validity and an encryption state of the MAC address and when the validity is not authenticated, alarming that the validity is not authenticated to a control server after waiting for the connection or when validity authentication is normally successful, connecting the V2I wireless communication through the MAC address.

Furthermore, step c) may include relaying data transmitted and received between the OBU connected by the V2I wireless communication and a control server connected by the I2I wireless communication.

Furthermore, step c) may include transmitting data for autonomous driving control of the control server to the OBU or collecting driving image data of a vehicle photographed by a camera in the OBU, and operation state information related to an autonomous driving sensor unit and a driving control unit of the vehicle, and transmitting the collected operation state information to a control server.

Furthermore, step d) may include analyzing a routing table received by another RSU and determining that the OBU is handed over when the MAC address of the OBU stored in the routing table thereof is confirmed.

According to various exemplary embodiments of the present invention, there is an effect that a wireless mesh network is constructed through inter-RSU I2I connection in a production factory to reduce initial investment cost and maintenance cost of an infrastructure facility, and facilitate extensibility.

Furthermore, there is an effect that the private mesh network is constructed in the production factory regardless of a carrier to increase the number of operated mobilities without a communication cost burden and an access by an external unauthorized terminal is fundamentally cut off to reinforce a security.

Furthermore, there is an effect that an inter-infrastructure I2I communication dedicated antenna and a V2I communication dedicated antenna with an on board unit (OBU) are differently designed in one RSU to reduce channel interference and maintain reliable communication.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise", and variations such as "comprises" or "comprising", will be understood to imply the inclusion of stated elements but not the exclusion of any other elements. In addition, the terms "-er", "-or", and "module" described in the specification mean units for processing at least one function and operation, and may be implemented by hardware components or software components, and combinations thereof.

Through the specification, terms including as first, second, A, B, (a), (b), and the like are used for describing various constituent elements, but the constituent elements are not limited by the terms. These terms are just intended to distinguish the components from other components, and the terms do not limit the nature, sequence, or order of the components.

It should be understood that, when it is described that a component is "connected to or accesses" another component, the component may be directly connected to or access another component or a third component may be present therebetween. In contrast, it should be understood that, when it is described that a component is "directly connected to" or "directly accesses" another component, it is understood that no component is present between the component and another component.

Terms used in the specification are used only to describe specific embodiments, and are not intended to limit the present invention. A singular form may include a plural form if there is no clearly opposite meaning in the context.

Unless otherwise defined in the specification, all terms used herein including technological or scientific terms have the same meanings as those generally understood by a person with ordinary skill in the art. Terms which are defined in a generally used dictionary should be interpreted to have the same meaning as the meaning in the context of the related art, and are not interpreted as an ideal meaning or excessively formal meanings unless clearly defined in the present specification.

Hereinafter, a V2X mesh network system and an operating method thereof according to exemplary embodiments of the present invention will be described in detail with reference to drawings.

Figure 1:
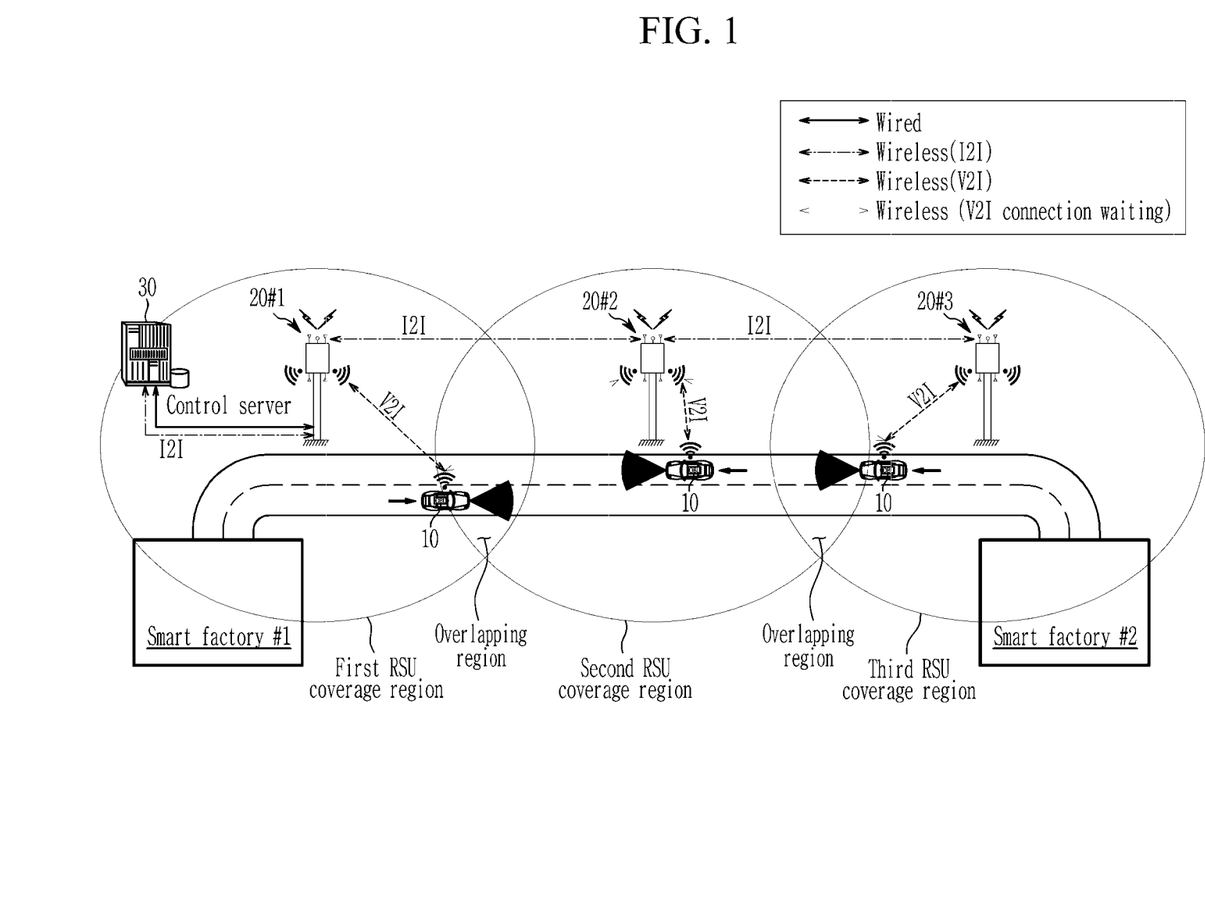
FIG. 1 schematically illustrates a configuration of a V2X mesh network system according to various exemplary embodiments of the present invention.
Figure 2:
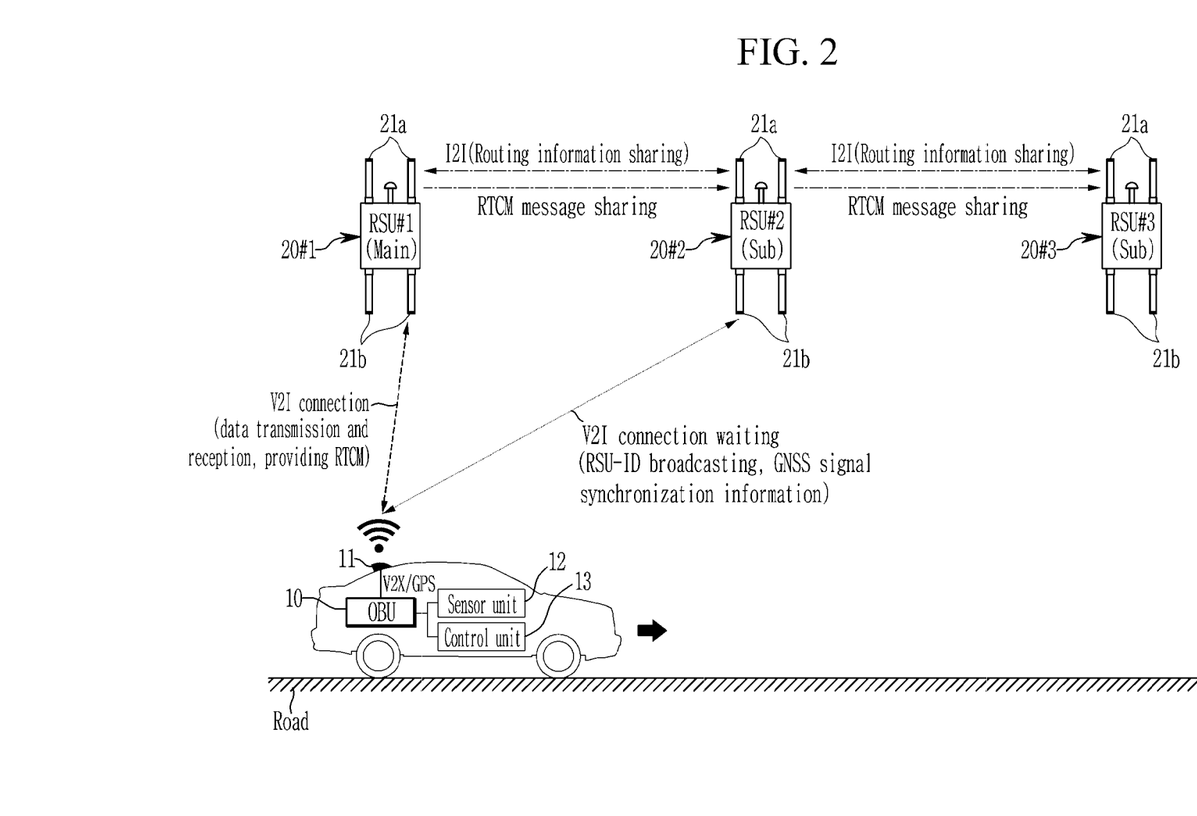
FIG. 2 illustrates a detailed configuration of a road side unit (RSU) and a vehicle of the V2X mesh network system according to various exemplary embodiments of the present invention.

FIG. 1 schematically illustrates a configuration of a V2X mesh network system according to various exemplary embodiments of the present invention. FIG. 2 illustrates a detailed configuration of a road side unit (RSU) and a vehicle of the V2X mesh network system according to various exemplary embodiments of the present invention.

Referring to FIG. 1 and FIG. 2, the V2X mesh network system according to various exemplary embodiments of the present invention includes an on board unit (OBU) 10 mounted on a mobility (hereinafter, referred to as a vehicle) operated in a production factory, a road side unit (RSU) 20, and a control server 30. The production factory is constituted by multiple small smart factories and workplaces, and as a result, a plurality of RSUs 20 arranged on a road connecting each section and the control server 30 construct a V2X wireless communication network.

The on board unit (OBU) 10 transmits and receives data through V2X communication and controls autonomous driving of the vehicle.

The OBU 10 may transmit and receive V2X communication data through an integrated antenna 11, and measure Global Navigation Satellite System (GNSS) based vehicle position information. The V2X communication includes vehicle-to-infrastructure (V2I) communication, vehicle-to-vehicle (V2V) communication, and vehicle-to-nomadic device (V2N) communication, and infra-to-infra (I2I) communication. Therefore, in the following description, it will be primarily described that the OBU 10 is connected to the RSU 20 through the V2I communication for various exemplary embodiments of the present invention, but the present invention is not limited thereto, and the OBU 10 and the RSU 20 may be connected through the V2V and V2V communications.

Furthermore, the OBU 10 may interlock with a sensor unit 12 that monitors surroundings for autonomous driving of the vehicle through an interface and a control unit 13 that controls a driving state.

The sensor unit 12 may include a camera, a radar, LiDAR, an ultrasonic sensor, and a position measurement sensor (GNSS/GPS).

The control unit 13 may include a transmission control unit (TCU), an electronic brake controller (electronic control suspension (ECS)/electronic stability control (ESC)), and a motor driven power steering (MDPS). Since as the sensor unit 12 and the control unit 13, known technology may be used, a detailed description is omitted.

The RSU 20 is disposed in plural in the production factory to construct a vehicle to everything (V2X) communication based private network, and relays wireless communication between the OBU 10 and the control server 30. Here, the RSU 20 may be referred to as RSU which is widely used in a field of the invention of the present invention, and may be referred to as other base station (BS), an access point (AP), and a radio access station (RAS).

The RSU 20 is mounted with a heterogeneous V2X module to form a full-mesh network in which the RSU 20 is connected to a neighboring infrastructure facility through infra-to-infra (I2I) wireless communication. Here, the RSU 20 forms a single topology connected to the OBU 10 through vehicle-to-infra (V2I) wireless communication to construct a V2X communication network optimized to a local private network based on wireless communication.

Furthermore, when the RSU 20 is easily wiredly connected to a first RSU 20 #1 adjacent to the control server 30 as in FIG. 1, the RSU 20 may form a partial-mesh network through wired connection.

Figure 3:
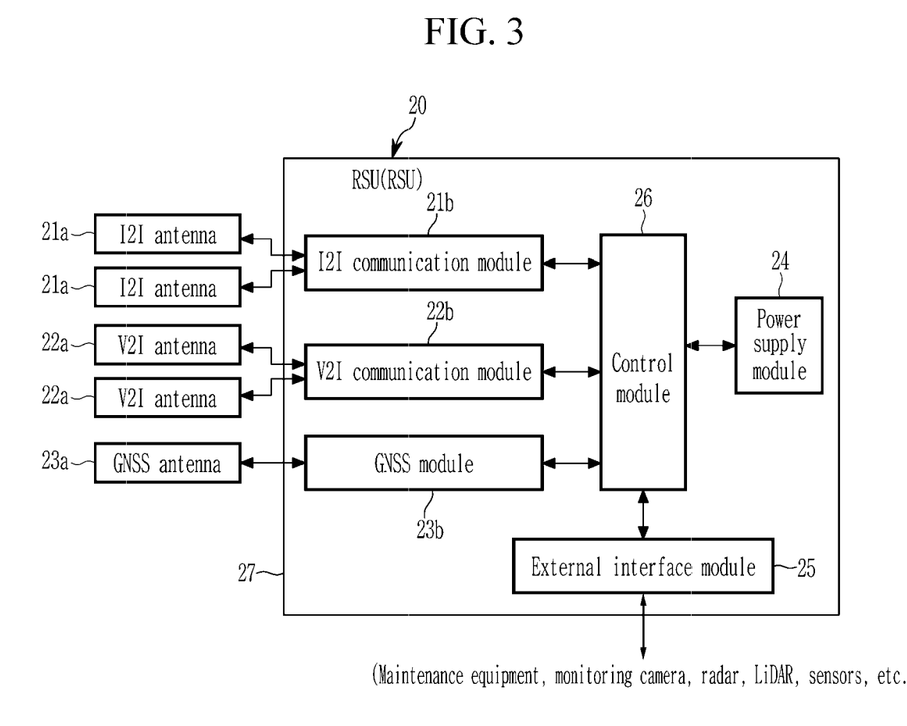
FIG. 3 is a block diagram schematically illustrating a configuration of the RSU according to various exemplary embodiments of the present invention.

FIG. 3 is a block diagram schematically illustrating a configuration of the road side unit (RSU) according to various exemplary embodiments of the present invention.

Referring to FIG. 3, the RSU 20 according to various exemplary embodiments of the present invention includes an I2I antenna 21a, an I2I communication module 21b, a V2I antenna 22a, a V2I communication module 22b, a GNSS antenna 23a, a GNSS module 23b, a power supply module 24, an external interface module 25, a control module 26, and a main body 27.

A plurality of I2I antennae 21a is provided on the top portion of the main body 27, and is connected to a wireless access in vehicular environment (WAVE) based I2I communication module 21b for constructing a private mesh network to transmit and receive I2I data between other RSUs 20.

A plurality of V2I antennae 22a is provided on the bottom portion of the main body 27, and is connected to the WAVE based V2I communication module 22b for constructing the private mesh network to transmit and receive the V2I data to and from the OBU 10. The V2X communication of the RSU 20 is differentiated from an LTE/5G based V2X communication scheme of a general carrier.

The RSU 20 is designed and manufactured as an I2I dedicated antenna and a V2I dedicated antenna by separating a channel and an antenna for each used section to prevent wireless interference between the I2I and V2I communications.

Figure 4:
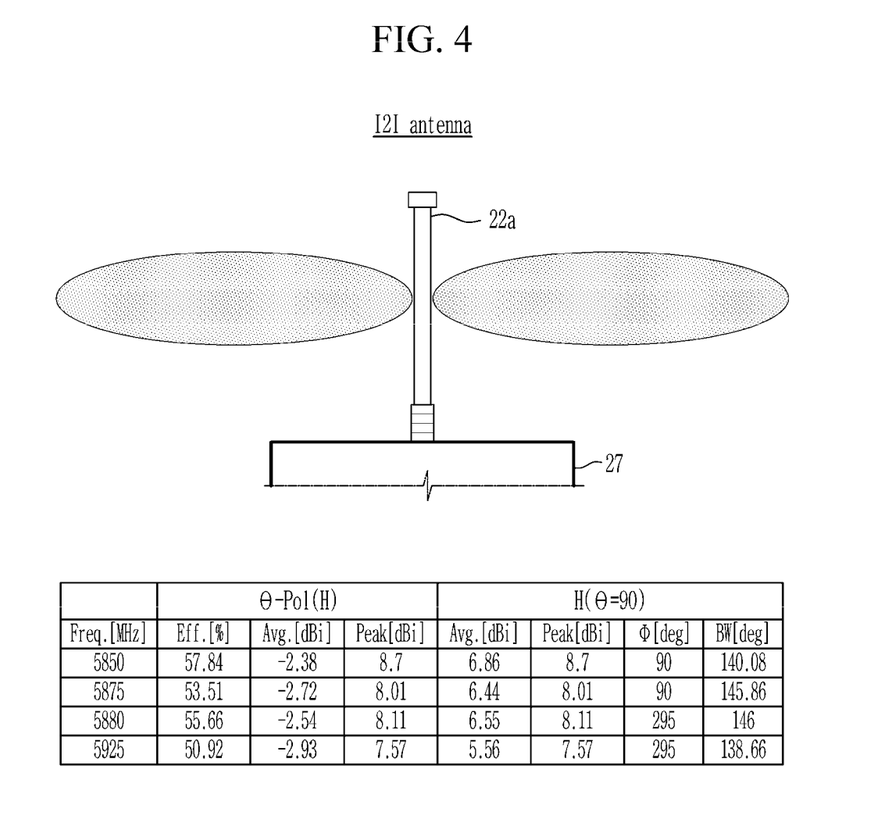
FIG. 4 and FIG. 5 illustrate radiation patterns of an I2I antenna and a V2I antenna for each channel according to various exemplary embodiments of the present invention.
Figure 5:
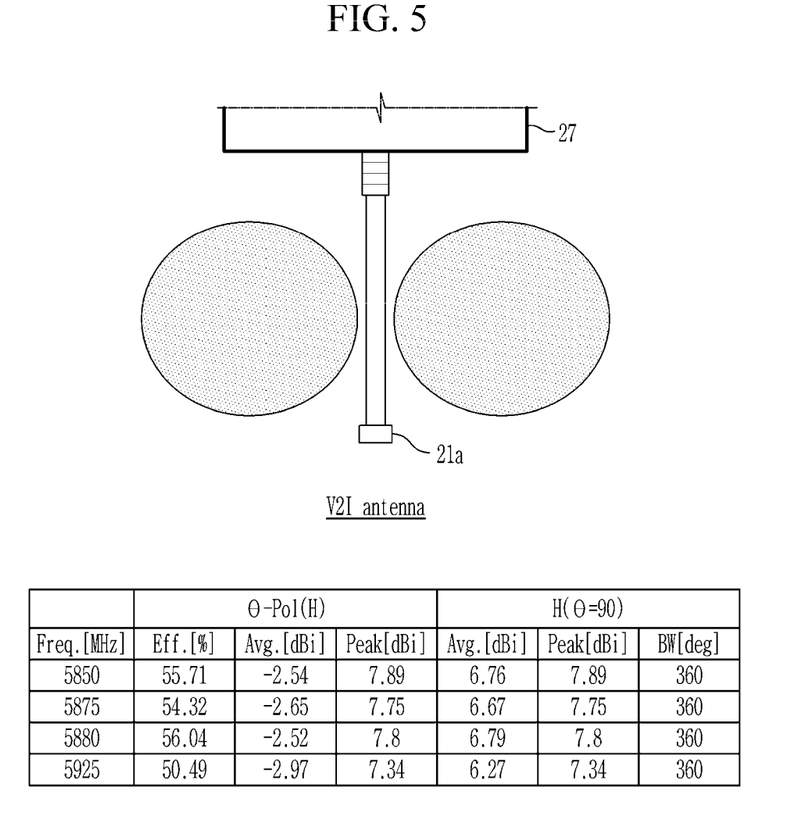

FIG. 4 and FIG. 5 illustrate radiation patterns of an I2I antenna and a V2I antenna for each channel according to various exemplary embodiments of the present invention.

Referring to FIG. 4 and FIG. 5, the I2I antenna 21a and the V2I antenna 22a according to various exemplary embodiments of the present invention are provided at opposite positions of the main body 27, and differently set a radiation pattern for each channel according to the I2I or V2I communication scheme.

The RSU 20 implements the I2I and V2I communication modules through the same V2X module in one main body, so it is preferable to minimize channel-specific interference according to heterogeneous wireless communication.

The main body 27 of the RSU 20 according to various exemplary embodiments of the present invention may be arranged in line in a road infrastructure facility such as street lights, traffic lights, etc. at a predetermined interval (e.g., 400 M) in a horizontal direction at a predetermined height (e.g., 2 M) from the ground (see FIG. 1 and FIG. 2).

Therefore, the I2I antenna 21a provided on the top portion of the main body 27 is oriented to the neighboring RSU 20 to form a radiation pattern having a relatively small vertical width in the horizontal direction.

Furthermore, the V2I antenna 22a provided on the bottom portion of the main body 27 is oriented to the ground to form a radiation pattern having a relatively large vertical width in a lower direction.

As a result, different radiation patterns are applied to the I2I antenna 21a and the V2I antenna 22a according to mutual oriented purposes, which achieve an effect of being configured for minimizing interference of a signal, and efficiently transmitting and receiving data.

The GNSS antenna 23a is connected to the GNSS module 23b to receive a satellite signal for measuring vehicular position information. The satellite signal may be GPS, GLONASS, and Galileo.

The GNSS module 23b may receive a multi-band (L1/L2) satellite signal, and acquire high-precision position information by real time Kinematic (RTK) supporting.

The OBU 10 controls the autonomous driving of the vehicle by measuring the GNSS/GPS based vehicular position information. However, there is a distance error due to a space atmospheric ion layer, a satellite orbital error, convection layer refraction, etc., in the vehicular position information, so that correction is required for safe autonomous driving.

Therefore, the GNSS module 23b supports a positioning correction function to generate high-precision RTK-GNSS based positioning error correction information (Radio Technical Commission Marine (RTCM) based on a fixed absolute coordinate of the RSU 20 and provide the generated RTCM to the OBU 10.

Referring to FIG. 2, one designated main RSU 20 #1 may generate the positioning error correction information (RTCM), and share a message with sub RSUs 20 #2 and 20 #3 therearound, and provide the message to the OBUs 10 connected thereto, respectively.

Through this, the OBU 10 corrects the vehicular position information with the positioning error correction information (RTCM) to reduce the vehicular position information to an error range of 10 cm or less, and as a result, more precise autonomous driving is possible. Furthermore, it is possible to reduce hardware cost for generating the positioning error correction information (RTCM) for each RSU.

The power supply module 24 converts a commercial AC power into a DC power required for operating the RSU 20 and supplies the DC power. The power supply module 24 includes a supercapacitor that charges the DC power and supplies a power during emergency to operate the RSU 20 uninterruptably during abnormal occurrence of the power supply or a blackout. Furthermore, the power supply module 24 further includes an earth leakage breaker and a surge protection circuit to secure safety.

The external interface module 25 includes at least one communication terminal of CAN, USB, serial communication (e.g., RS232/485), and Ethernet.

The external interface module 25 is connected to maintenance equipment of an operator from the outside thereof to provide firmware upgrade, software change, and environment setting.

Furthermore, the external interface module 25 may be connected to at least one detection equipment of a monitoring camera, a radar, LiDAR, a temperature sensor, an infrared sensor, and a gyro sensor provided and operated in road infrastructures including street lights, traffic lights, telephone poles, etc., together with the RSU 20.

The control module 26 controls an overall operation of each module for operating the RSU 20 according to various exemplary embodiments of the present invention, and stores various programs and data for the controlled operation in a memory.

The control module 26 relays data transmitted and received between the OBU 10 and the control server 30 connected through the V2X wireless communication. For example, the control module 26 may collect driving image data of the vehicle photographed by the camera, and operation state information related to the sensor unit 12 and the control unit 13 from the OBU 10, and transmit the collected driving image data and the operation state information to the control server 30.

The control module 26 broadcasts unique RSU-ID to a coverage region through the V2I communication module 22b, and connects new V2I communication with the OBU 10 which enters the corresponding coverage region.

The control module 26 receives an MAC address of the OBU 10 and updates the received MAC address to a routing table when connecting the new V2I communication, and shares the updated routing table by I2I communication with other RSUs therearound. This means that the control module 26 of the corresponding RSU 20 propagates connection of the V2I communication by adding the MAC address of a new OBU 10 to a routing table thereof (RSU-ID) to another RSU 20 #n.

When this is described in another aspect, the control module 26 may determine the MAC address of the OBU 10 being connected for each RSU by receiving the updated routing table from another RSU 20 #n therearound.

The control module 26 may provide a handover that seamlessly maintains the V2I wireless communication of the OBU 10 through sharing the routing table through the I2I communication with another RSU 20.

That is, the control module 26 may control a handover depending on a request from the OBU 10 which enters or exits to a coverage region from a coverage overlapping region with another neighboring RSU 20 to mutually share the resulting added/deleted routing table.

Furthermore, the control module 26 may receive and store validity information and encryption information related to the MAC address assigned to the operated OBU 10 from the control server 30, and connect the V2I communication only with respect to the OBU 10 which is normally authorized according to the received and stored validity information and encryption information. Through this, it is possible to reinforce the security from external hacking/intrusion by fundamentally interrupting an illegal access of an external unauthorized terminal.

The control server 30 is a computing system that controls operation states of the OBU and the vehicle forming the V2X mesh network at the center.

The control server 30 stores navigation schedule information related to the vehicle generated according to a work process plan/schedule of the production factory, and generates autonomous driving information for vehicle operation based on the stored navigation schedule information and transmits the generated autonomous driving information to the OBU 10. The autonomous driving information may include a destination, a driving route, and a driving velocity.

The control server 30 may monitor inspection and a behavior state of a vehicle which moves to the destination by collecting the operation state information and the driving image data of the vehicle through the RSU 20, and controls emergency stop when abnormality occurs.

Figure 6:
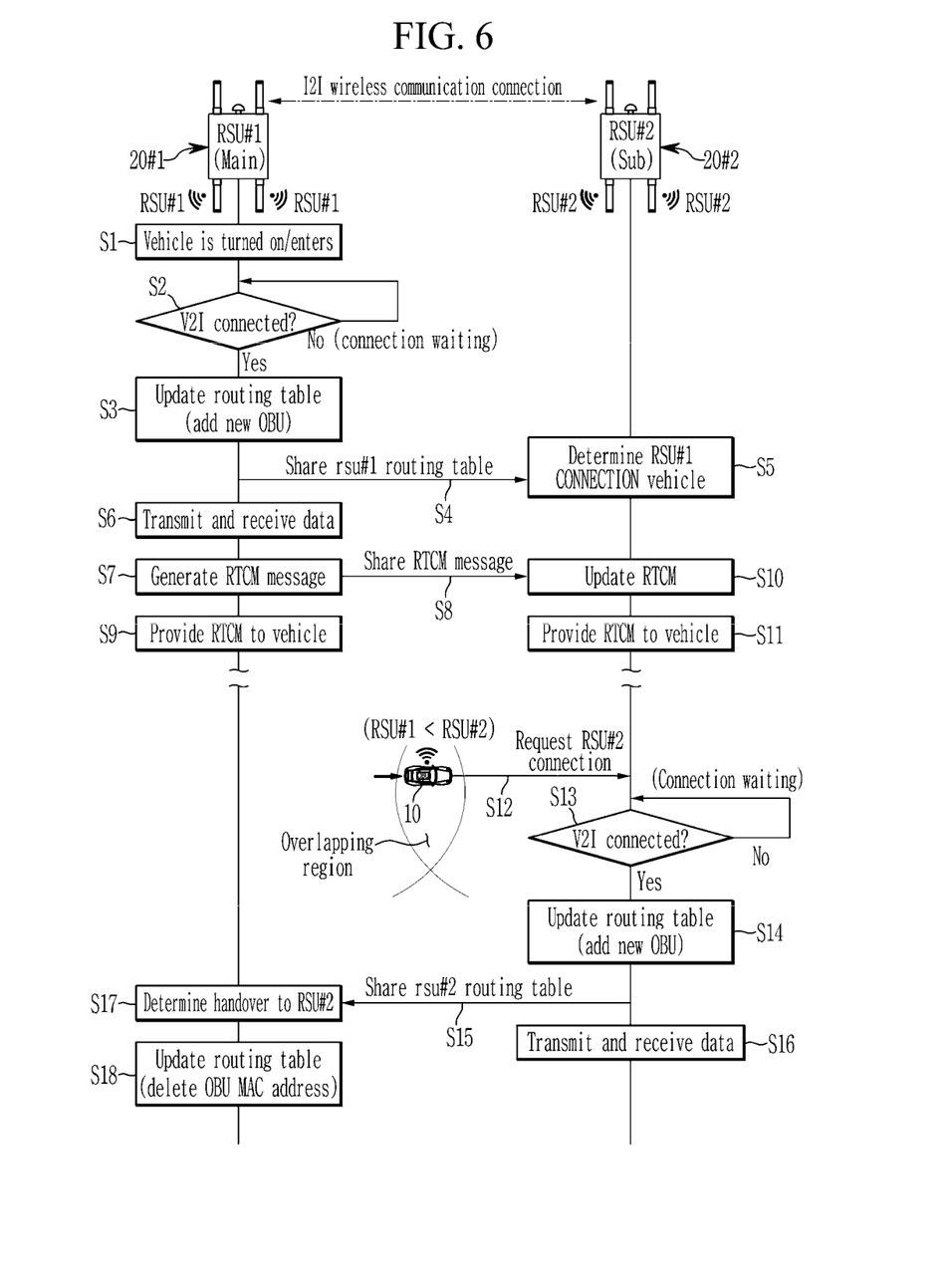
FIG. 6 is a flowchart schematically illustrating an operating method of a V2X mesh network system according to various exemplary embodiments of the present invention.

Meanwhile, a V2X mesh network operating method according to various exemplary embodiments of the present invention is described through FIG. 6 based on the configuration of the V2X mesh network system.

However, to assist understanding of the description, the V2X mesh network operating method will be described by assuming an operation scenario when the vehicle moves from a first coverage region to a second coverage region while the first RSU 20 #1 and the second RSU 20 #2 described with reference to FIG. 1 and FIG. 2 connect the I2I communication by the mesh network.

FIG. 6 is a flowchart schematically illustrating an operating method of a V2X mesh network system according to various exemplary embodiments of the present invention.

Referring to FIG. 6, the first RSU 20 #1 and the second RSU 20 #2 constituted in the mesh network of the production factory broadcast unique RSU-IDs RSU #1 and RSU #2 for accessing the OBU 10 to the coverage region, respectively. The RSU-ID may mean a wireless communication address of each RSU.

The first RSU 20 #1 receives a MAC address according to a connection (access) request from the OBU 10 of the vehicle which is turned on or enters in the corresponding coverage region (S1).

The first RSU 20 #1 checks validity and an encryption state of the MAC address and waits for V2I connection when the validity is not authenticated (S2; No). In the instant case, the first RSU 20 #1 alarms validity authentication failure information to the control server to strengthen the security of the mesh network.

On the other hand, when the first RSU 20 #1 normally succeeds in validity authentication, the first RSU 20 #1 connects the V2I wireless communication through the MAC address (S2; Yes).

The first RSU 20 #1 updates the MAC address to the routing table to add the connection of the new OBU 10 (S3), and shares a routing table message through unique RSU-ID RSU #1 with another RSU connected by the I2I communication (S4).

In the instant case, when the second RSU 20 #2 receives the routing table sharing message, the second RSU 20 #2 may determine information (MAC address) of the OBU 10 connected to the first RSU 20 #1 according to identification of the unique RSU-ID RSU #1 (S5).

The first RSU 20 #1 relays data transmitted and received between the OBU 10 and the control server 30 connected by the V2I communication (S6). For example, the first RSU 20 #1 may transmit data for autonomous driving control to the OBU 10 or collect driving image data of the vehicle photographed by the camera, and operation state information related to the sensor unit 12 and the control unit 13 from the OBU 10, and transmit the collected driving image data and the operation state information to the control server 30.

The first RSU 20 #1 as a main RSU generates high-precision RTK-GNSS based positioning error correction information (Radio Technical Commission Marine (RTCM)) based on a fixed absolute coordinate (S7), shares the generated RTCM with another sub RSU (S8), and provides the RTCM to the OBU 10 (S9).

In the instant case, the second RSU 20 #2 as a sub RSU updates the shared RTCM (S10), and provides RTCM for positioning correction of the vehicle connected thereto (S11).

Meanwhile, when the OBU 10 is located in the coverage overlapping region while moving to a region of the second RSU 20 #2 while being V2I connected to the first RSU 20 #1, the OBU 10 may simultaneously receive broadcasting signals RSU #1 and RSU #2 from both RSUs.

The OBU 10 compares both signals RSU #1 and RSU #2 and selects any one RSU having a larger received signal strength indication (RSSI) to maintain current connection or request new connection.

For example, when the OBU 10 maintains the connection when the received signal strength indication of the signal RSU #1 of the first RSU 20 #1 is large, but makes a new connection request to the second RSU 20 #2 when the received signal strength indication of the signal RSU #2 of the second RSU 20 #2 is large. In the instant case, a handover in an overlapping region between the RSUs 20 is made through the new connection request. Here, it is described that the OBU 10 receives both signals RSU #1 and RSU #2 according to the above assumed exemplary embodiment of the present invention, but the OBU 10 may actually generate a priority list by receiving signals RSU #N from more RSUs. Furthermore, the OBU 10 may make a connection request (i.e., handover request) by selecting one of the candidate RSUs connectable according to a priority.

Meanwhile, when the second RSU 20 #2 receives a MAC address according to the connection request of the OBU 10 (S12), the second RSU 20 #2 checks the validity and the encryption state of the MAC address and waits for the V2I connection when the validity is not authenticated (S13; No). Similarly, even in the instant case, the second RSU 20 #2 may alarm the validity authentication failure information to the control server.

On the other hand, when the second RSU 20 #2 normally succeeds in validity authentication, the second RSU 20 #2 connects the V2I wireless communication through the MAC address (S13; Yes).

The second RSU 20 #2 updates the MAC address to the routing table to add the connection of the new OBU 10 (S14), and shares a routing table message through unique RSU-D RSU #2 with another RSU connected by the I2I communication (S15). Furthermore, the second RSU 20 #2 relays data transmitted and received between the OBU 10 and the control server 30 connected by the V2I communication (S16).

Meanwhile, when the first RSU 20 #1 receives the routing table sharing message through the ID RSU #2 of the second RSU 20 #2, the first RSU 20 #1 analyzes the received routing table sharing message, and determines a state in which the MAC address of the OBU 10 stored in a routing table thereof is handed over to the second RSU 20 #2 (S17).

The connection of the first RSU 20 #1 to the OBU 10 is terminated through an update of deleting the MAC address stored in the routing table thereof (S18).

As a process through RSU-to-RSU interlocking of the V2X mesh network in the production factory, the vehicle may be safely moved from smart factory zone #1 to smart factory zone #2 by autonomous driving as illustrated in FIG. 1.

As described above, according to various exemplary embodiments of the present invention, a wireless mesh network is constructed through inter-repeater (RSU) I2I connection in a production factory to reduce initial investment cost and maintenance cost of an infrastructure facility and facilitate extensibility.

Furthermore, there is an effect that the private mesh network is constructed in the production plant regardless of a carrier to increase the number of operated mobilities without a communication cost burden and an access by an external unauthorized terminal is fundamentally cut off to reinforce a security.

Furthermore, there is an effect that an inter-infrastructure I2I communication dedicated antenna and a V2I communication dedicated antenna with a vehicle terminal (OBU) are differently designed in one repeater (RSU) to reduce channel interference and maintain reliable communication.

The exemplary embodiments of the present invention are not implemented only by the above-described apparatus and/or method, but may be implemented through a program for implementing functions corresponding to the configuration of the exemplary embodiment of the present invention, a recording medium on which the program is recorded, and the like and the present invention may be easily implemented by those skilled in the art from the detailed description described above.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings.

The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle to everything (V2X) mesh network system supporting a mobility operation of a production factory, the V2X mesh network system comprising:
    a road side unit (RSU) which is disposed in plural in the production factory, and connects infra-to-infra (I2I) wireless communication with an infrastructure facility, and connects vehicle-to-infra (V2I) wireless communication with an on board unit (OBU) mounted on an autonomous driving vehicle to form a V2X mesh network; and
    a control server controlling operation states of the OBU and the vehicle through the V2X mesh network,
    wherein the RSU includes:
        an I2I antenna which is provided on a top portion of a main body of the RSU in plural, and is connected to a wireless access in vehicular environment (WAVE) based I2I communication module for constructing a private mesh network to transmit and receive data between other RSUs;
        a V2I antenna which is provided on a bottom portion of the main body in plural, and is connected to the WAVE based V2I communication module to transmit and receive data to and from the OBU;
        a GNSS antenna which is connected to a GNSS module and receives a satellite signal for measuring vehicle position information of the vehicle;
        a power supply module which converts an AC power into a DC power required for operating the RSU and supplies the DC power;
        an external interface module which is connected to an external maintenance equipment, and provides at least one of firmware upgrade, software change, and environment setting; and
        a control module which is electrically connected to the I2I communication module, the V2I communication module and the GNSS module, relays data transmitted and received between the OBU and the control server connected by V2X wireless communication,
    wherein the control module is configured to broadcast unique RSU-ID to a coverage region through the V2I communication module and to connect new V2I wireless communication with the OBU which is turned on and enters in a region, and
    wherein the control module is configured to receive a Media Access Control (MAC) address and to update the received MAC address to a routing table when connecting the OBU, and to share the updated routing table with other surrounding RSUs through the I2I wireless communication.

2. The V2X mesh network system of claim 1, wherein the OBU transmits and receives V2X communication data through an integrated antenna and measures global navigation satellite system (GNSS) according to vehicular position information of the vehicle.

3. The V2X mesh network system of claim 1, wherein the I2I antenna and the V2I antenna differently set a radiation pattern for each channel according to I2I and V2I wireless communication schemes.

4. The V2X mesh network system of claim 3,
    wherein the I2I antenna is oriented to another RSU disposed in a horizontal direction at a predetermined height from the ground to form a radiation pattern having a relatively small vertical width in the horizontal direction, and wherein the V2I antenna is oriented to a lower direction of the ground to form a radiation pattern having a relatively larger vertical width than the I2I antenna.

5. The V2X mesh network system of claim 1, wherein the GNSS module receives multi bands (L1/L2) of one or more satellite signals of GPS, GLONASS, and Galileo, and acquires high-precision position information of which an error is corrected by real time Kinematic (RTK) supporting.

6. The V2X mesh network system of claim 1, wherein the GNSS module generates high-precision RTK-GNSS based positioning error correction information (Radio Technical Commission Marine (RTCM) based on a fixed absolute coordinate of the RSU and provides the generated RTCM to the OBU.

7. The V2X mesh network system of claim 6, wherein the GNSS module installed in a designated main RSU shares the positioning error correction information (RTCM) with surrounding sub RSUs and provides the RTCM to OBUs connected thereto, respectively.

8. The V2X mesh network system of claim 6, wherein the OBU corrects the vehicle position information with the positioning error correction information (RTCM).

9. The V2X mesh network system of claim 1, wherein the external interface module connects at least one detection equipment of a monitoring camera, a radar, LiDAR, a temperature sensor, an infrared sensor, and a gyro sensor provided and operated in road infrastructures.

10. The V2X mesh network of claim 1, wherein the control module is configured to receive and store validity information and encryption information related to a MAC address assigned to the operated OBU from the control server, and to connect the V2I communication only with respect to the OBU which is normally authorized according to the received and stored validity information and encryption information.

11. A vehicle to everything (V2X) mesh network system supporting a mobility operation of a production factory, the V2X mesh network system comprising:

a road side unit (RSU) which is disposed in plural in the production factory, and connects infra-to-infra (I2I) wireless communication with an infrastructure facility, and connects vehicle-to-infra (V2I) wireless communication with an on board unit (OBU) mounted on an autonomous driving vehicle to form a V2X mesh network; and a control server controlling operation states of the OBU and the vehicle through the V2X mesh network, wherein the RSU includes:

an I2I antenna which is provided on a top portion of a main body of the RSU in plural, and is connected to a wireless access in vehicular environment (WAVE) based I2I communication module for constructing a private mesh network to transmit and receive data between other RSUs;

a V2I antenna which is provided on a bottom portion of the main body in plural, and is connected to the WAVE based V2I communication module to transmit and receive data to and from the OBU;

a GNSS antenna which is connected to a GNSS module and receives a satellite signal for measuring vehicle position information of the vehicle;

a power supply module which converts an AC power into a DC power required for operating the RSU and supplies the DC power;

an external interface module which is connected to an external maintenance equipment, and provides at least one of firmware upgrade, software change, and environment setting; and a control module which is electrically connected to the I2I communication module, the V2I communication module and the GNSS module, relays data transmitted and received between the OBU and the control server connected by V2X wireless communication, wherein the control module is configured to broadcast unique RSU-ID to a coverage region through the V2I communication module and to connect new V2I wireless communication with the OBU which is turned on and enters in a region, and wherein the control module is configured to control a handover depending on a request from the OBU which enters or exits to a coverage region thereof from a coverage overlapping region with another neighboring RSU to share a resulting added/deleted routing table with another RSU.

\* \* \* \* \*